US009928790B2

(12) United States Patent
Li et al.

(10) Patent No.: US 9,928,790 B2
(45) Date of Patent: Mar. 27, 2018

(54) DISPLAY PANEL, DISPLAYER AND DRIVING METHOD

(71) Applicant: BOE Technology Group Co., Ltd., Beijing (CN)

(72) Inventors: Pan Li, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 176 days.

(21) Appl. No.: 14/547,427

(22) Filed: Nov. 19, 2014

(65) Prior Publication Data
US 2016/0012792 A1 Jan. 14, 2016

(30) Foreign Application Priority Data
Jul. 11, 2014 (CN) .......................... 2014 1 0332132

(51) Int. Cl.
G09G 3/36 (2006.01)
G02F 1/13363 (2006.01)

(52) U.S. Cl.
CPC ....... *G09G 3/3648* (2013.01); *G02F 1/13363* (2013.01); *G09G 2300/0426* (2013.01); *G09G 2300/0443* (2013.01); *G09G 2358/00* (2013.01)

(58) Field of Classification Search
None
See application file for complete search history.

(56) References Cited

U.S. PATENT DOCUMENTS 6,191,830 B1 * 2/2001 Gogna .............. G02F 1/136213
349/38
8,599,344 B2 12/2013 Yeh et al.
(Continued)

FOREIGN PATENT DOCUMENTS

CN 101425274 A 5/2009
CN 101840073 A 9/2010
(Continued)

OTHER PUBLICATIONS

First Office Action, including Search Report, for Chinese Patent Application No. 201410332132.4, dated May 31, 2016, 12 pages.
(Continued)

*Primary Examiner* — Patrick Edouard
*Assistant Examiner* — Matthew Yeung
(74) *Attorney, Agent, or Firm* — Westman, Champlin & Koehler, P.A.

(57) ABSTRACT

The present invention discloses a display panel, a displayer and the drive method thereof, the display panel including a cell substrate, the outermost side thereof having an FPR film array including a first FPR film and a second FPR film, and an array substrate including a plurality of gate lines and a plurality of data lines. A sub-pixel unit is defined by an i-th line gate line, an (i+1)-th line gate line, a j-th column data line and a j+1-th column data line, i and j being both natural number. The first FPR film is corresponding to the first pixel electrode to convert emitting light of the latter into polarized light in a first direction, and the second FPR film is corresponding to the second pixel electrode to convert emitting light of latter into polarized light in a second direction, the first direction being different from the second direction.

16 Claims, 5 Drawing Sheets

(56) References Cited

U.S. PATENT DOCUMENTS

| | | | |
|---|---|---|---|
| 9,075,263 B2 | 7/2015 | Yeh et al. | |
| 2002/0118154 A1* | 8/2002 | Kim | G09G 3/3648 345/87 |
| 2007/0064162 A1* | 3/2007 | Yamamoto | G09G 3/2092 348/790 |
| 2008/0158264 A1* | 7/2008 | Park | G09G 3/3648 345/690 |
| 2010/0238097 A1 | 9/2010 | Baik et al. | |
| 2012/0262430 A1* | 10/2012 | Ho | G02F 1/13624 345/204 |
| 2013/0002652 A1* | 1/2013 | Woo | G02B 27/26 345/419 |
| 2013/0076785 A1* | 3/2013 | Chen | G09G 3/001 345/629 |
| 2013/0100106 A1* | 4/2013 | Wu | G09G 3/2074 345/212 |
| 2014/0085578 A1* | 3/2014 | Gu | G02F 1/133514 349/106 |
| 2015/0085002 A1 | 3/2015 | Li et al. | |

FOREIGN PATENT DOCUMENTS

| | | |
|---|---|---|
| CN | 102253532 A | 11/2011 |
| CN | 103293756 A | 9/2013 |
| CN | 103792703 A | 5/2014 |

OTHER PUBLICATIONS

Second Office Action for Chinese Patent Application No. 201410332132.4, dated Oct. 19, 2016, 11 pages.

* cited by examiner

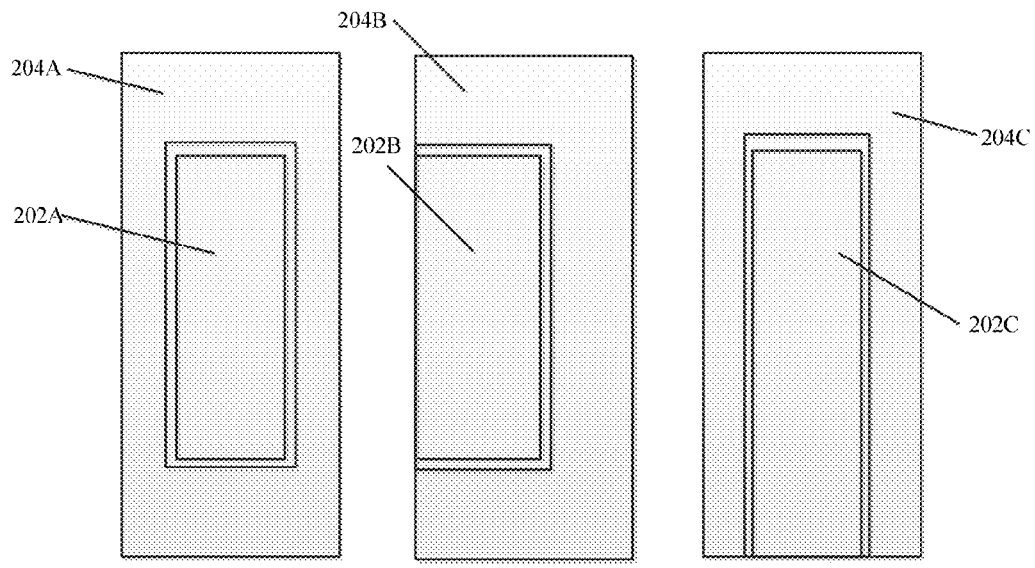
Fig. 2a  Fig. 2b  Fig. 2c
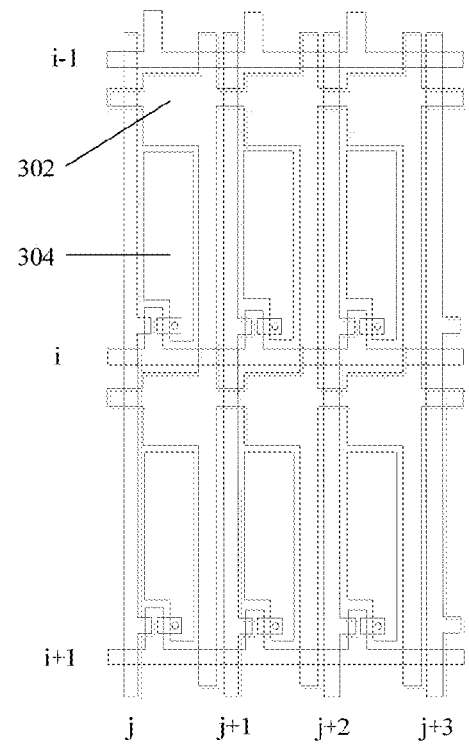
Fig. 3

DISPLAY PANEL, DISPLAYER AND DRIVING METHOD

CROSS-REFERENCE TO RELATED APPLICATION

This application claims the benefit of Chinese Patent Application No. 201410332132.4 filed on Jul. 11, 2014 in the State Intellectual Property Office of China, the whole disclosure of which is incorporated herein by reference.

BACKGROUND OF THE INVENTION

Field of the Invention

The present invention relates to a field of display technology, and more particularly, relates to a display panel, a displayer and a driving method for an array substrate in of the display panel.

Description of the Related Art

Presently, a Liquid Crystal Display (LCD) has various kinds of auxiliary features, such as touch, 3 dimensions (3D) displaying, flexible and the like. Furthermore, green displayer having features of thin structure, low power consumption and multi-function has already been developed.

During the development of liquid crystal display technology, in view of the drawbacks of the products itself, such as visual angel-based problem existing in liquid crystal molecule itself, many kinds of liquid crystal displays having wide visual angle mode, such as Advanced Super Dimension Switch (ADSDS, or ADS for short), In-Plane Switching (IPS) and Multi-domain Vertical Alignment (MVA), have been developed. For example, by means of the narrow visual angle feature of liquid crystal molecule itself, normal display zone is only limited within a narrow front visual angle zone, display information in both left and right sides thus cannot be seen clearly so as to produce privacy protection effect to some extent. However, the person, stealing privacy information intentionally or unintentionally, always stands behind the user or captures the information with an invisible camera, which may capture the display information clearly within certain range of visual angle without being noticed by the user. Hence, the privacy of the user cannot be protected effectively by means of narrow visual angle mode showing image only in the front visual angle zone, which may cause the leakage of privacy of the user in some circumstance.

To sum up, the displayer in prior art cannot output the original image while outputting the interference image, so that the original image can be seen by the peeper with their naked eyes, which may cause the leakage of original image information.

SUMMARY OF THE INVENTION

The present invention provide a display panel, a displayer and a drive method for an array substrate in of a display panel, the displayer may show the original images as well as the interference image at the same time, thereby the original image shown in the displayer cannot not be seen, preventing the original image from being seen by a peeper with his/her naked eyes, which may cause the leakage of the information of original image.

In one aspect of the present invention, there is provided a display panel, comprising:

an array substrate including a plurality of gate lines and a plurality of data lines, wherein, a sub-pixel unit is defined by an i-th line gate line, an (i+1)-th line gate line, a j-th column data line and a (j+1)-th column data line, wherein, i and j are both natural number, the sub-pixel unit comprising:
  a first TFT, a gate of the first TFT being electrically connected to the (i+1)-th line gate line, a source of the first TFT being electrically connected to the j-th column data line, and a drain of the first TFT being electrically connected to a first pixel electrode by a first via;
  a first pixel electrode for controlling display of an original image; and
  a second pixel electrode for controlling display of an interference image; and
a cell substrate, the outermost side of the cell substrate being provided with an FPR film array, the FPR film array comprising:
  a first FPR film corresponding to the first pixel electrode so as to convert emitting light of the first pixel electrode into polarized light in a first direction; and
  a second FPR film corresponding to the second pixel electrode so as to convert emitting light of the second pixel electrode into polarized light in a second direction, wherein, the first direction is different from the second direction.

In a further aspect of the present invention, there is provided a displayer, comprising the display panel according to any one of the above-mentioned embodiments.

In a still aspect of the present invention, there is provided a drive method for an array substrate in a display panel, the array substrate including a plurality of gate lines and a plurality data lines, wherein, a sub-pixel unit is defined by an i-th line gate line, an (i+1)-th line gate line, a j-th column data line and a (j+1)-th column data line, wherein, i and j are both natural number, the sub-pixel unit comprising:
  a first TFT, a gate of the first TFT being electrically connected to the (i+1)-th line gate line, a source of the first TFT being electrically connected to the j-th column data line, and a drain of the first TFT being electrically connected to a first pixel electrode by a first via;
  a first pixel electrode for controlling display of original image; and
  a second pixel electrode for controlling display of interference image;
  the method comprising the following steps:
  by a image process unit, acquiring original image of each frame from a system board, generating a interference image, and performing a superposition of the original image and the interference image so as to acquire mixed image and then transmit the mixed image to a time-controller; and
  by the Time-Controller, processing the mixed image and then transmitting data signal and gate signal to a source driver IC and a gate driver IC, respectively, so as to drive the first pixel electrode to display the original image and drive the second pixel electrode to display the interference image.

BRIEF DESCRIPTION OF THE DRAWINGS

The above and other features of the present invention will become more apparent by describing in detail exemplary embodiments thereof with reference to the accompanying drawings, in which:

FIGS. 2a-2c are schematic principle views of contrastive shapes of two pixel electrodes in the array substrate according to some embodiments of the present invention;

FIG. 3 is a partial plan view of the array substrate according to another embodiment of the present invention;

DETAILED DESCRIPTION OF PREFERRED EMBODIMENTS OF THE INVENTION

Figure 1:
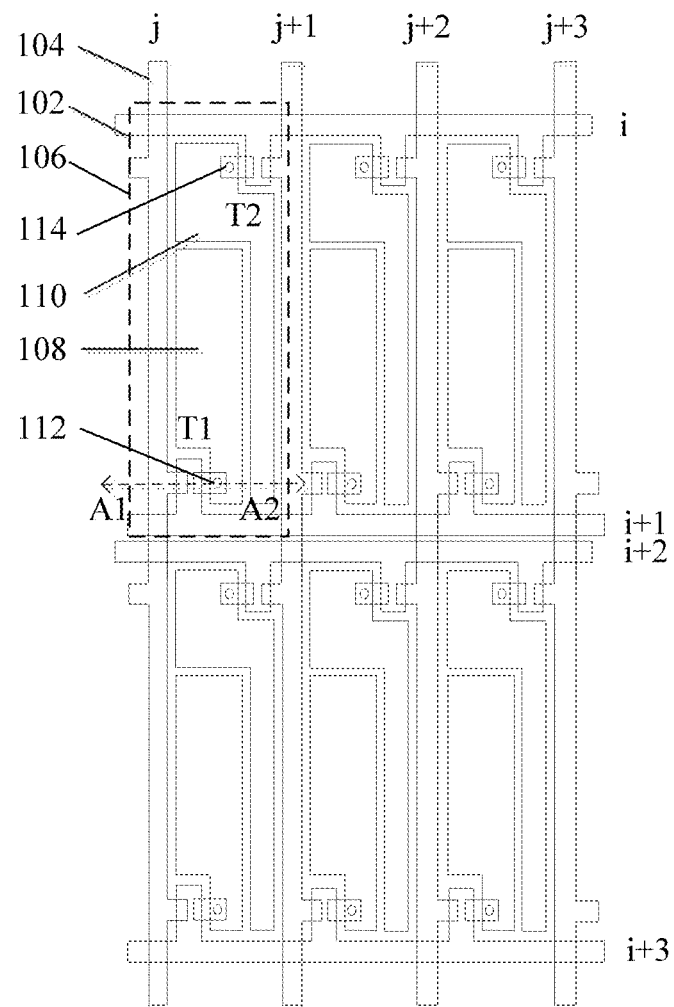
FIG. 1 is a partial plan view of an array substrate according to an embodiment of the present invention.

Embodiments of the display panel, the displayer, the display device and driving method thereof provided by embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The thickness of each film layer and the size and shape of each area in the attached drawings do not reflect the actual parameters of each component of the array substrate, but are intended for illustrating the embodiments of the present invention only. It should be noted that the display panel is exemplified by a liquid crystal display panel and the cell substrate is exemplified by a color filter substrate. Of course, the array substrate and color filter substrate provided by the present invention are also applicable to an Organic Light-Emitting Diode (OLED) display panel.

According to a general concept of the present invention, there is provided a display panel, comprising a cell substrate and an array substrate. The array substrate comprises a plurality of gate lines and a plurality of data lines, wherein, a sub-pixel unit is defined by an i-th line gate line and an (i+1)-th line gate line which are adjacent to each other, and a j-th column data line and a (j+1)-th column data line which are adjacent to each other, wherein, i and j are both natural number. The sub-pixel unit comprises a first TFT (thin film transistor), a first pixel electrode for controlling display of an original image and a second pixel electrode for controlling display of an interference image. A gate of the first TFT is electrically connected to the (i+1)-th line gate line, a source of the first TFT is electrically connected to the j-th column data line, and a drain of the first TFT is electrically connected to the first pixel electrode by a first via. The outermost side of the cell substrate is provided with a Film-type Patterned Retarder (FPR) film array, and the FPR film array comprises a first FPR film and a second FPR film, wherein, the first FPR film is corresponding to the first pixel electrode so as to convert the emitting light of the first pixel electrode into the polarized light in a first direction, and the second FPR film is corresponding to the second pixel electrode so as to convert the emitting light of the second pixel electrode into the polarized light in a second direction, wherein, the first direction is different from the second direction.

In the display panel according to the embodiment of the present invention, the original image is shown in the first pixel electrode, while the interference image is shown in the second pixel electrode. The emitting light of the first pixel electrode for showing the original image is converted into the polarized light in the first direction by the FPR film array, and at the same time, the emitting light of the second pixel electrode showing the interference image is converted into the polarized light in the second direction, such that the original image shown in each sub-pixel unit is affected by the interference image. Therefore, the original image shown in the displayer cannot be seen and the display information in displayer is protected effectively. Compared with the prior art that the original image are shown within narrow visual angle range in a displayer, the technology in the present invention may prevent the display information from being stolen by a peeper more effectively.

In an exemplary embodiment, referring to FIG. 1, an array substrate according to the embodiment of the present invention comprises a plurality of gate lines 102 and a plurality of data lines 104. A sub-pixel unit 106 is defined by an i-th line gate line and an (i+1)-th line gate line which are adjacent to each other, a j-th column data line and a a (j+1)-th column data line which are adjacent to each other, wherein, i and j are both natural number. The sub-pixel unit 106 comprises a first TFT T1, a second TFT T2, a first pixel electrode 108 for controlling display of an original image and a second pixel electrode 110 for controlling display of an interference image. A gate of the first TFT T1 is electrically connected to the (i+1)-th line gate line, a source of the first TFT T1 is electrically connected to the j-th column data line, and a drain of the first TFT T1 is electrically connected to the first pixel electrode 108 by a first via 112. A gate of the second TFT T2 is electrically connected to the i-th line gate line, a source of the second TFT T2 is electrically connected to the (j+1)-th column data line, and a drain of the second TFT T2 is electrically connected to the second pixel electrode 110 by a second via 114.

As shown in FIG. 1, the first TFT T1 is located in the vicinity of an intersection of the (i+1)-th line gate line and the j-th column data line, and the second TFT T2 is located in the vicinity of an intersection of the i-th line gate line and the (j+1)-th column data line.

In an alternative embodiment, the first TFT T1 may be located in the vicinity of an intersection of the (i+1)-th line gate line and the (j+1)-th column data line, specifically, the gate of the first TFT T1 is electrically connected to the (i+1)-th line gate line, and the source of the first TFT T1 is electrically connected to the (j+l)-th column data line, and the drain of the first TFT T1 is electrically connected to the first pixel electrode 108 by a first via. The second TFT T2 is located in the vicinity of an intersection of the i-th line gate line and the j-th column data line, specifically, the gate of the second TFT T2 is electrically connected to the i-th line gate line, the source of the second TFT T2 is electrically connected to the j-th column data line, and the drain of the second TFT T2 is electrically connected to the second pixel electrode by a second via. That's to say, the first TFT T1 and the second TFT T2 are located in diagonal positions in each sub-pixel unit.

In the array substrate shown in FIG. 1, the contrastive shapes of the first pixel electrode 108 and the second pixel electrode 110 may adopt any one of the shapes shown in FIGS. 2a-2c. As shown in FIGS. 2a-2c, the first pixel electrode and the second pixel electrode may have shapes shown as the first pixel electrode 202A and the second pixel electrode 204A (see FIG. 2a), or the first pixel electrode 202B and the second pixel electrode 204B (see FIG. 2b), or the first pixel electrode 202c and the second pixel electrode 204c (see FIG. 2c), respectively. It certainly should be understood by the person skilled in this art that the first pixel electrode and the second pixel electrode may have many other shapes and contrastive positions, wherein, the exemplary shapes and contrastive positions are shown in FIGS. 2a-2c, but not limited thereto.

In the display panel according to the embodiment of the present invention, as shown in FIG. 1, the contrastive positions of the first pixel electrode and the second pixel electrode may be disposed in parallel. In an alternative embodiment, the first pixel electrode 202A is fully surrounded by the second pixel electrode 204A (see FIG. 2a); or the first pixel electrode 202B is partially surrounded by the second pixel electrode 204B, for example, one length side and two width sides of the first pixel electrode 202B are surrounded (see FIG. 2b); or the first pixel electrode 202C is partially surrounded by the second pixel electrode 204C, for example, two length sides and one width side of the first pixel electrode 202C are surrounded (see FIG. 2c).

FIG. 3 shows another array substrate according to an exemplary embodiment of the present invention, wherein, what is different from the array substrate shown in FIG. 1 is that in the array substrate shown in FIG. 3, the second pixel electrodes 302 in a plurality of sub-pixel units are connected with each other, extend to a non-display area (not shown in FIG. 3) and are connected with a control switch (not shown in FIG. 3). In this way, by inputting a high level or a low level signal into the second pixel electrodes 302 by the control switch, the second pixel electrodes 302 are controlled to display interference image. For example, when the control switch inputs a high level signal to the second pixel electrodes 302, the second pixel electrodes 302 may be controlled to show interference image, such as high light image (white light); when the control switch inputs a low level signal to the second pixel electrodes 302, the second pixel electrodes 302 have a zero voltage value, and the corresponding display area thus is entirely black.

In an exemplary embodiment, as shown in FIG. 3, the array substrate includes the first pixel electrodes 304 and the second pixel electrodes 302, wherein, the second pixel electrode 302 includes a part located in non-display area, and the second pixel electrodes 302 are connected with each other to form as a whole by the non-display areas, that is to say, the part located in the non-display area which is connected to the second pixel electrode 302 is regarded as a part of the second pixel electrode 302.

With respect to the array substrate shown in FIG. 1, each sub-pixel unit shown in array substrate of FIG. 3 may achieve a save of one TFT, and the whole array substrate may cut the amount of gate lines in half (gate lines i, i+2, i+4, i+6 . . . ). Thus, the array substrate shown in FIG. 3 takes up a relative small area and is easy to implement.

Figure 4:
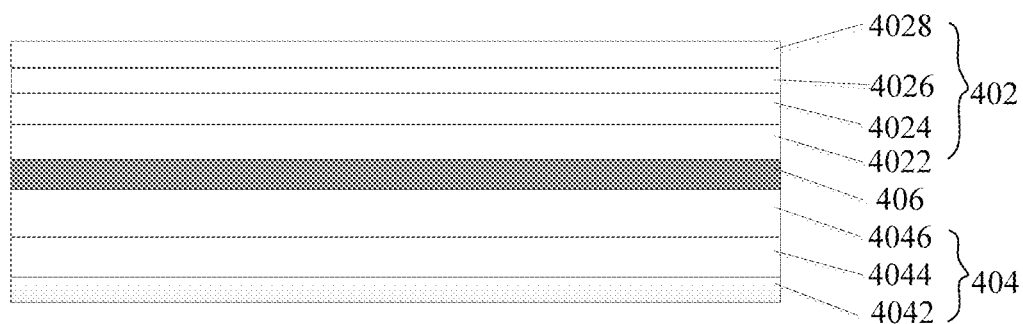
FIG. 4 is a partial sectional view of a liquid crystal display panel according to an embodiment of the present invention.

The present invention provides a liquid crystal display panel, as shown in FIG. 4, comprising a color filter substrate 402, an array substrate 404 and a liquid crystal layer 406 between the color filter substrate 402 and the array substrate 404. The array substrate 404 is any kind of the array substrates provided in the embodiments of the present invention. The color filter substrate 402 comprises: a color filter 4022, a first substrate 4024 provided on the color filter 4022, an upper polarizing filter 4026 provided on the first substrate 4024 and a Film-Type Patterned Retarder (FPR) film array 4028 attached on the outermost side of the color filter substrate 402. The FPR film array 4028 comprises a first FPR film and a second FPR film, wherein, the first FPR film is corresponding to the first pixel electrode so as to convert the emitting light of the first pixel electrode into a polarized light in a first direction, and the second FPR film is corresponding to the second pixel electrode so as to convert the emitting light of the second pixel electrode into a polarized light in a second direction, wherein, the first direction is different from the second direction. In an exemplary embodiment, the first direction is substantially opposite to the second direction, for example, a direction is direct toward left, and the other direction is direct toward right.

In an exemplary embodiment, the emitting light of the first pixel electrode is converted into a left-handed (or levorotatory) light by the first FPR film, and the emitting light of the second pixel electrode is converted into the right-handed (or dextrorotatory) light by the second FPR film so as to protect display information on display panel effectively and prevent the privacy of a user from leaking. As can be understood, the array substrate 404 certainly comprises a lower polarizing filter 4042, a second substrate 4044 provided on the lower polarizing filter 4042 and a pixel array 4046 provided on the second substrate 4044 (i.e. the pixel array as shown in FIGS. 1 and 3).

In the liquid crystal display panel provided by the embodiments of the present invention, the emitting light of the first pixel electrode for showing the original image is converted into the polarized light in the first direction by the FPR film array, while the emitting light of the second pixel electrode for showing the interference image is converted into the polarized light in the second direction different from the first direction, such that the original image shown in each sub-pixel unit is affected by the interference image, that's to say, the original image and the interference image may be seen at the same time, thereby original image shown in the displayer cannot be seen and display information in displayer is protected effectively. Compared with the prior art that the original image are shown within narrow visual angle range in the displayer, the technology in the present invention may prevent the display information from being stolen by a peeper more effectively.

Figure 5:
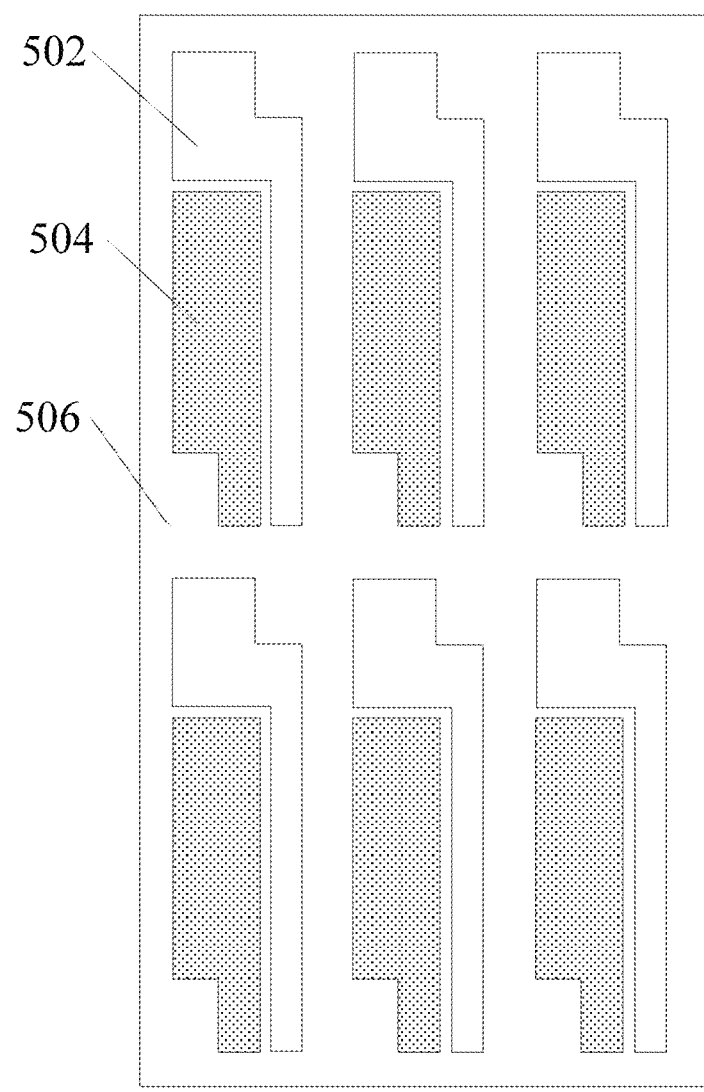
FIG. 5 is a partial plan view of the color filter according to an embodiment of the present invention.

In the liquid crystal display panel provided by the embodiment of the present invention, as shown in FIG. 5, the color filter substrate comprises a transparent portion 502 provided in the same layer as that of a color filter 504, and the color filter 504 is corresponding to the first pixel electrode, and the transparent portion 502 is corresponding to the second pixel electrode.

In an array substrate according to the embodiment of the present invention, as shown in FIG. 1 or FIG. 3, when the first pixel electrode shows the normal image and the interference image shown by the second pixel electrode has an interference signal with arbitrary gray value, the color filter 504 in the color filter substrate is provided to be corresponding to the first pixel electrode (the first pixel electrode 108 as shown in FIG. 1 or the first pixel electrode 304 as shown in FIG. 3), and the transparent portion 502 is provided to be corresponding to the second pixel electrode (the second pixel electrode 110 as shown in FIG. 1 or the second pixel electrode 302 as shown in FIG. 3), and there are no color filter and black matrix in the transparent portion 502. It should be understood that the color filter substrate comprises a black matrix 506, which is provided to block the gate lines, data lines, the first TFTs and the second TFTs provided on the array substrate. When the second pixel electrode is controlled to show white light, the white light is emitted through the transparent portion 502 and converted the emitted white light into the left-handed light or the right-handed light by the second FPR film, so as to realize the interference to normal and original image.

Figure 6:
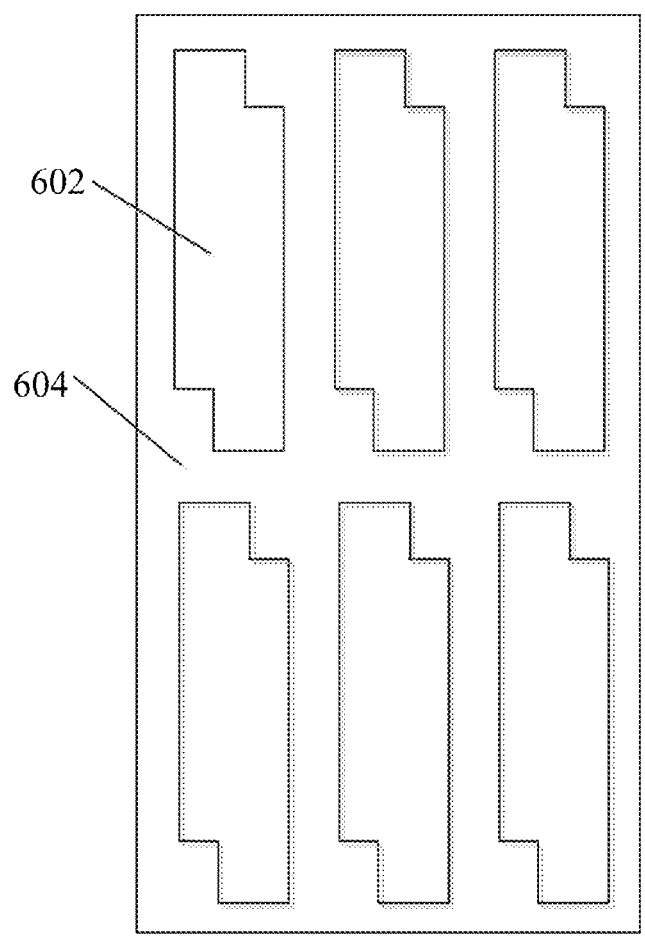
FIG. 6 is a partial plan view of the color filter according to another embodiment of the present invention.

In another array substrate according to the embodiment of the present invention, as shown in FIG. 1 or FIG. 3, when the first pixel electrode shows the normal image and the interference image shown by the second pixel electrode is the anti-color image of the normal image, as shown in FIG. 6, the color filter layer in the color filter substrate is the same as that of the prior art, and does not need to provide a transparent portion, wherein, the color filter 602 is provided to be corresponding to the first FPR film and the second FPR film. The color filter also comprises a black matrix 604, which is provided to block the gate lines, data lines, the TFTs provided on the array substrate.

According to the embodiment of the present invention, there is provided a displayer, comprising a display panel, such as a liquid crystal display panel, provided by any one of the embodiments of the present invention, wherein, the display panel has the array substrate as shown in FIG. 3, the voltage of the second pixel electrode thereof is directly controlled by the control switch so as to control whether or not to show interference image without the anti-color process of the image.

In the displayer provided by the embodiments of the present invention, by showing the original image in the first pixel electrode and showing the interference image in the second pixel electrode, the sub-pixel unit shows the original images as well as the interference image such that the original image shown in each sub-pixel unit is affected by the interference image, thereby the original image shown in the displayer cannot be seen and the display information in displayer is protected effectively. Compared with the prior art that the original image are shown within narrow visual angle range in the displayer, the technology in the present invention may prevent the display information from being stolen by a peeper more effectively.

Specifically, as shown in FIG. 3, the normal display signal is input into the gate line for controlling the first pixel electrode 304 via the data line, and the interference signal is input into the gate line for controlling the second pixel electrode 302 via the data line, wherein, the interference signal may have a voltage value corresponding to an arbitrary gray value except the gray value of the normal display signal, for example, the voltage value corresponding to 255 gray value is adopted. Further, the brightness of the interference image is maximized by the transparent portion of the color filter substrate as shown in FIG. 5. At this time, the brightness of the second pixel electrode 302 is much larger than that of the first pixel electrode 304 so as to conceal the normal display image.

It should be understood by the person skilled in this art that by controlling the interference signal input into the second pixel electrode 302, the switch between the peeking-proof display states, where the interference image conceals the normal display image, and the normal display states may be realized. Specifically, when the voltage value input into the second pixel electrode 302 is set as a voltage value corresponding to 0 gray value, the area of the second pixel electrode 302 has no any brightness, and does not affect the normal display of the first pixel electrode 304 so as to realize the normal display function.

As can be seen from the exemplary embodiments, in the array substrate as shown in FIG. 3, the display control signal for the second pixel electrode 302 needs no any signal process, and whether or not to the second pixel electrode 302 shows the interference image is directly controlled by adjusting the input voltage level, so as to ease the burden of the signal processor.

Meanwhile, the second pixel electrodes 302 are communicated with each other by non-display area, and the display in the areas of the second pixel electrodes 302 is controlled by a control switch. Hence, compared with the case that the second pixel electrodes 302 are not communicated with each other by non-display area and the display is controlled by a plurality of gate lines, the array substrate of the embodiments of the present invention decreases cost.

Figure 7:
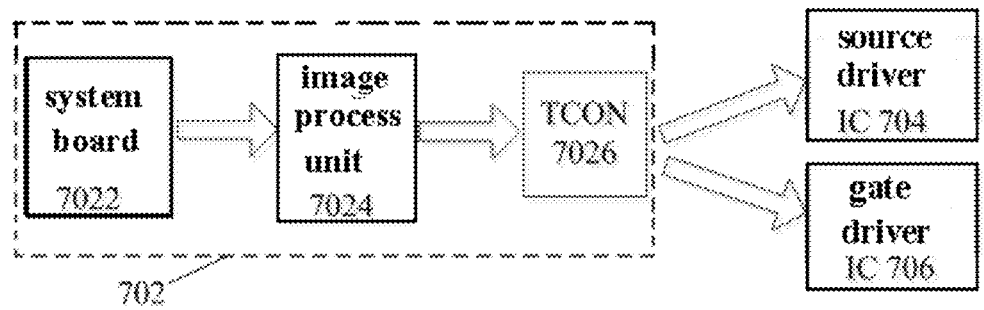
FIG. 7 is a schematic principle block diagram of signal process device of a liquid crystal display according to an embodiment of the present invention.

The displayer of the embodiments of the present invention comprises the signal process device 702 as shown in FIG. 7 and the liquid crystal display panel provided by the embodiments of the present invention. The liquid crystal display panel comprises the plurality of gate lines and the plurality of data lines, wherein, the sub-pixel unit is surrounded by the i-th line gate line and the (i+1)-th line gate line which are adjacent to each other, and the j-th column data line and the (j+1)-th column data line which are adjacent to each other, wherein, i and j are both natural number. The sub-pixel unit comprises the first TFT, the second TFT, the first pixel electrode for controlling the display of the original image and the second pixel electrode for controlling the display of the interference image. The gate of the first TFT is electrically connected to the (i+1)-th line gate line, the source of the first TFT is electrically connected to the j-th column data line, and the drain of the first TFT is electrically connected to the first pixel electrode by the first via. The gate of the second TFT is electrically connected to the i-th line gate line, the source of the second TFT is electrically connected to the (j+1)-th column data line, and the drain of the second TFT is electrically connected to the second pixel electrode by the second via.

Specifically, as shown in FIG. 7, the signal process device 702 comprises a system board 7022, an image process unit 7024 and a Time-Controller (TCON) 7026. The system board 7022 is configured to input the data signal of the original image into the image process unit 7024, and the image process unit 7024 is configured to mix the data signal of the original image with the data signal of the interference image and then output the mixed signal to the TCON 7026. The TCON 7026 is configured to process the mixed signal and then output source drive signal to a source driver IC 704 and output gate drive signal to a gate driver IC 706.

In the displayer provided by the embodiments of the present invention, the data signal of the original image is mixed with the data signal of the interference image by the image process unit 7024 so as to show original image as well as interference image at the same time in the sub-pixel unit. In this way, the original image shown in each sub-pixel unit is affected by the interference image; thereby the original image shown in the displayer cannot be seen and the display information in displayer is protected effectively. Compared with the prior art that the original image are shown within narrow view angle range in the displayer, the technology in the present invention may prevent the display information from being stolen by a peeper more effectively.

In the displayer provided by the embodiments of the present invention, the image process unit 7024 is further configured to perform an anti-color process to the d data ate signal of the original image, serve the acquired data signal of a anti-color image of the original image as a data signal for the interference image; and perform an interlace superposition of the data signal of the original image and the data signal of the anti-color image according to pixel lines to acquire a mixed signal and then output the mixed signal to the TCON 7026.

Firstly, the system board 7022 outputs a n-th frame of original image to the image process unit 7024, and the image process unit 7024 performs an anti-color process for the n-th frame of original image to obtain a n-th frame of anti-color image. Specifically, each pixel of the n-th frame of original image is subject to an anti-color process, that's to say, if a RGB gray values of the pixel of original image is (x, y, z), the RGB gray values of the pixel after the anti-color process is changed as (255-x, 255-y, 255-z), the n-th frame of anti-color image is obtained after the anti-color process of each pixel of the n-th frame of original image is performed.

Next, the image process unit 7024 performs an superposition of the n-th frame of original image and the n-th frame of anti-color image so as to form a n-th frame of mixed image. The n-th frame of mixed image is processed by the TCON 7026 (for time control) and then is output to the source driver IC (for outputting data signal) and the gate driver IC (for outputting gate signal) from the TCON 7026 so as to drive the display of the pixel.

As shown in FIG. 1, the normal image display signal is input into the gate line for controlling the first pixel electrode 108 via the data line, and the interference image display signal is input into the gate line for controlling the second pixel electrode 110 via the data line, wherein, the interference image display signal may have the voltage value corresponding to an arbitrary gray value departing from the gray value of the normal image display signal, since the interference function may be achieved as long as the gray value of the interference image display signal is different from the gray value of the normal image display signal. In order to achieve much better interference function and show gray image, the anti-color image signal of image data signal of the original image may be used as the display signal of the interference image. Specifically, the largest gray value of a image is 255, for example, when the gray value of the original image shown by the first pixel electrode 108 is X, the gray value of the interference image shown by the second pixel electrode 110 in the same sub-pixel unit is (255-X).

It should be understood by the person skilled in this art that by controlling the display signal of the interference image input into the second pixel electrode 110, the switch between the peeking-proof display states, where the interference image blocks the normal display image, and the normal display states may be realized.

Specifically, when the display signal input into the second pixel electrode 110 is also display signal of the original image, the display image of the second pixel electrode 110 will not affect the normal display of the area of the first pixel electrode 108 so as to realize the normal display function.

The image process unit 7024 may comprise Field-Programmable Gate Array (FPGA), by which the image process function may be realized. It should be noted that the image process function may be realized by a customized and dedicated image process chip.

In the displayer provided by the embodiments of the present invention, the image process unit 7024 is further configured to perform an interlace superposition of the data signal of the original image and the data signal of the interference image according to the pixel lines to acquire a mixed signal and then output the mixed signal to the TCON 7026, wherein, the gray value of the interference image has the largest gray value, for example 255.

Specifically, the system board 7022 outputs the n-th frame of original image to the image process unit 7024, and the image process unit 7024 performs an interlace superposition of the n-th frame of original image and the data signal of the interference image having a largest gray value according to the pixel lines so as to form a n-th frame of mixed image. The n-th frame of mixed image is processed by the TCON 7026 (for time control) and then is output to the source driver IC (for outputting data signal) and the gate driver IC (for outputting gate signal) from the TCON 7026 so as to drive the display of the pixel.

As shown in FIG. 1, the normal image display signal is input into the gate line for controlling the first pixel electrode 108 via the data line, and the interference image display signal is input into the gate line for controlling the second pixel electrode 110 via the data line. The gray value of the interference image display signal may have the largest gray value (i.e. 255), thus, the brightness of the area of the second pixel electrode 110 is much larger than that of the first pixel electrode 108 so as to conceal the normal display image.

It should be understood by the person skilled in this art that by controlling the gray value of the interference image display signal input into the second pixel electrode 110, the switch between the peeking-proof display states, where the interference image conceals the normal display image, and the normal display states may be realized. Specifically, when the gray value input into the second pixel electrode 110 is 0 gray value, the area of the second pixel electrode 110 has no any brightness, and does not affect the normal display of the first pixel electrode 108 so as to realize the normal display function.

According to the embodiments of the present invention, there is provided a display device, comprising: a displayer provided by the embodiments of the present invention, and polarizing glasses for filtering the interference image. For example, if the emitting light of the original image that is normally shown is left-handed (or levorotatory) light and the emitting light of the interference image is right-handed (or dextrorotatory) light, then the polarizing glasses is left-handed polarizing glasses.

In the display device provided by the embodiment of the present invention, by means of the above-mentioned displayer, the original image shown in each sub-pixel unit is affected by the interference image, thereby the original image shown in the displayer cannot be seen and the display information in displayer is protected effectively. Compared with the prior art that the original image are shown within narrow view angle range in the displayer, the technology in the present invention may prevent the display information from being stolen by a peeper more effectively.

Certainly, it should be understood by the person skilled in this art that the display device may be a displayer, a cell-phone, a TV, a laptop and All-in-on PC. The display device is provided to prevent the display information from being stolen by other users. The users of the displayer may see the normal image shown in the displayer, the polarizing direction of the polarizing glasses provided for the user of the displayer should concur with the deflection direction of the light deflection signal in the image signal of the original image of the displayer so as to filter the image signal of the interference image.

According to another aspect of the invention, there is provided a drive method of the array substrate according to any of the embodiments, comprising: the image process unit acquires the original image of each frame from the system board 7022 and generates an interference image; and performs superposition process of the normal image and the interference image to acquire a mixed image and then outputs the mixed image to the TCON; then, the TCON processes the mixed image and then transmits data signal and gate signal to the source driver IC and the gate driver IC, respectively, so as to drive the first pixel electrode to display original image and drive the second pixel electrode to display interference image.

With respect to the drive method of the array substrate according to any of the embodiments, by superimposing the original image on the anti-color image to mix them, the original image is shown in the first pixel electrode of the sub-pixel unit, and the interference image is shown in the second pixel electrode, so that the shown original image is affected by the interference image, thereby the original image shown in the displayer cannot be seen and the display information in displayer is protected effectively. Compared with the prior art that the original image are shown within narrow visual angle range in the displayer, the technology in the present invention may prevent the display information from being stolen by a peeper more effectively.

In drive method of the array substrate according to any of the embodiments, the interference image is the anti-color image of the original image or an image having the largest gray value, for example, a white light having the gray value of 255.

Figure 8:
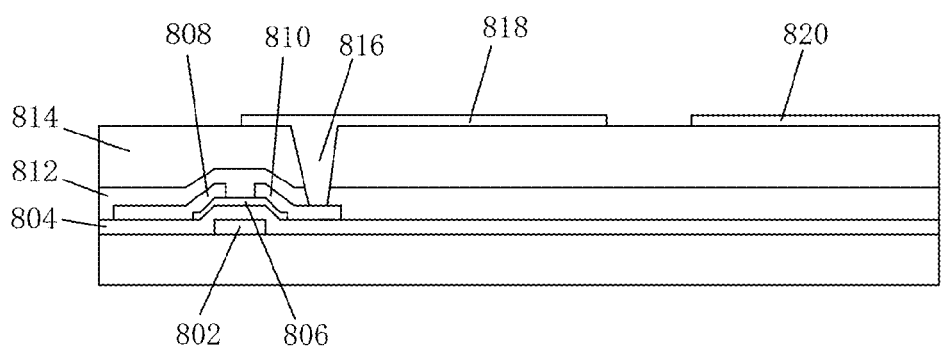
FIG. 8 is a partial sectional view of the array substrate of FIG. 1 taken along line A1-A2 according to an embodiment of the present invention.

Taking the structure of the array substrate according to the embodiment for instance, and in conjunction with FIG. 8, in the following, the method of manufacturing the array substrate will be described in details:

Step 1: performing sputter on the second substrate of the array substrate to deposit a metal layer, such as Aluminum, and performing a first patterning process, including applying photoresist, exposing, developing, etching, to form patterns of gate lines and gates 802;

Step 2: depositing a gate insulator layer 804, such as SiN, by Plasma Enhanced Chemical Vapor Deposition (PEVCD) method;

Step 3: depositing a semi-conductor layer, for example, depositing a-Si layer by PEVCD method or depositing Indium Gallium Zinc Oxide (IGZO) by a sputter process; performing a second patterning process, including applying photoresist, exposing, developing, etching, to form a pattern of active layer 806;

Step 4: depositing a metal layer, such as Aluminum, by a sputter process, and performing a third patterning process, including applying photoresist, exposing, developing, etching, to form patterns of data lines, sources 808 and drains 810;

Step 5: depositing a passivation layer 812, for example a SiN layer, by PEVCD method, and then applying a resin layer 814; performing a fourth patterning process, including applying photoresist, exposing, developing, etching, to form patterns of vias 816; a drain 810 of a TFT being exposed by the via 816;

Step 6: forming transparent metallic oxide conductive material layer, for example N-type oxide semi-conductor, such as Indium Tin Oxides (ITO), performing a fifth patterning process, including applying photoresist, exposing, developing, etching, to form patterns of a first pixel electrode 818 and a second pixel electrode 820.

In the embodiment of the present invention, the resin layer 814 is provided on the passivation layer 812 of the array substrate. The data lines and gate lines may be made of metal material, such as Cu, Al, Mo, Ti, Cr, W and the alloy thereof, and the gate lines may be a single layer structure and may also be multi-layer structure, such as Mo/Al/Mo, Ti/Cu/Ti, Mo/Tli/Cu. The gate insulator layer 804 may adopt SiN or SiO; and the gate insulator layer 804 may be a single layer structure and may also be multi-layer structure, such as SiO/SiN. The active layer 806 may adopt a-Si or oxide semi-conductor. The passivation layer 812 may adopt inorganic material, such as SiO. The resin layer 814 may adopt common resin, and may also adopt photosensitive resin. The pixel electrode (the first pixel electrode 818 and the second pixel electrode 820) may be made of transparent conductive oxide material, such as IZO, ITO and the like.

According to the display panel, the displayer, the display device and the driving method thereof, the original image is shown in the first pixel electrode of the sub-pixel unit, and the interference image is shown in the second pixel electrode, so that the shown original image is affected by the interference image, thereby the original image shown in the displayer cannot be seen and the display information in displayer is protected effectively.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display panel, comprising:
an array substrate including a plurality of gate lines and a plurality of data lines, wherein, a sub-pixel unit is defined by an i-th line gate line, an (i+1)-th line gate line, a j-th column data line and a (j+1)-th column data line, wherein, i and j are both natural number, the sub-pixel unit comprising:
a first TFT, a gate of the first TFT being electrically connected to the (i+1)-th line gate line, a source of the first TFT being electrically connected to the j-th column data line, and a drain of the first TFT being electrically connected to a first pixel electrode by a first via;
a first pixel electrode for controlling display of an original image;
the sub-pixel unit further comprising a second TFT, a gate of the second TFT being electrically connected to the i-th line gate line, a source of the second TFT being electrically connected to the (j+1)-th column data line, and a drain of the second TFT being electrically connected to the second pixel electrode by a second via; and
a second pixel electrode for controlling display of an interference image; and
a cell substrate, the outermost side of the cell substrate being provided with an FPR film array, the FPR film array comprising:
a first FPR film arranged to conform to the first pixel electrode so as to convert emitting light of the first pixel electrode into polarized light in a first direction; and
a second FPR film arranged to conform to the second pixel electrode so as to convert emitting light of the second pixel electrode into polarized light in a second direction, wherein, the first direction is different from the second direction,
wherein the second pixel electrodes in a plurality of sub-pixel units are interconnected, extend to a non-display area and are connected with a control switch, and the second pixel electrodes are connected with each other to form as a whole and integral common second pixel electrode by the non-display area, a high level signal or a low level signal being input into the second pixel electrode by the control switch so as to control the second pixel electrode to display interference image.

2. The display panel according to claim 1, wherein, the first direction is opposite to the second direction.

3. The display panel according to claim 1, wherein, the first pixel electrode and the second pixel electrode are disposed in parallel, or the first pixel electrode is fully surrounded by the second pixel electrode, or the first pixel electrode is partially surrounded by the second pixel electrode.

4. The display panel according to claim 1, wherein, the cell substrate is a color filter substrate comprising a color filter, a substrate provided on the color filter, and an upper polarizing filter provided on the substrate, and the FPR film array is attached on the upper polarizing filter.

5. The display panel according to claim 4, wherein, the color filter substrate comprises a transparent portion provided in the same layer as that of the color filter, the color filter being corresponding to the first pixel electrode, and the transparent portion being corresponding to the second pixel electrode.

6. The display panel according to claim 1, wherein, the display panel is a liquid crystal display panel or an organic light-emitting diode display panel.

7. A displayer, comprising the display panel according to claim 1.

8. The displayer according to claim 7, further comprising a signal process device comprising:
a system board configured to input the data signal of the original image;
a image process unit configured to mix the data signal of the interference image and the data signal of the original image so as to output a mixed signal; and
a time-controller configured to process the mixed signal and then output source driving signal to a source driver IC and gate driving signal to a gate driver IC, respectively.

9. The displayer according to claim 8, wherein, the image process unit is further configured to:
perform an anti-color process of the data signal of the original image, and serve the acquired data signal of the anti-color image of the original image as the data signal of the interference image; and
perform an interlace superposition of the data signal of the original image and the data signal of the anti-color image according to pixel lines to acquire a mixed signal and then output the mixed signal to the time-controller.

10. The displayer according to claim 8, wherein, the image process unit is further configured to perform an interlace superposition of the data signal of the original image and the data signal of the interference image according to the pixel lines to acquire a mixed signal and then output the mixed signal to the time-controller, wherein, the gray value of the interference image is set as the largest gray value.

11. The displayer according to claim 7, wherein, the first direction is opposite to the second direction.

12. The displayer according to claim 7, wherein, the sub-pixel unit further comprising a second TFT, a gate of the second TFT being electrically connected to the i-th line gate line, a source of the second TFT being electrically connected to the (j+1)-th column data line, and a drain of the second TFT being electrically connected to the second pixel electrode by a second via.

13. The displayer according to claim 7, wherein, the second pixel electrodes in a plurality of sub-pixel units are interconnected, extend to a non-display area and are connected with a control switch, a high level signal or a low level signal being input into the second pixel electrode by the control switch so as to control the second pixel electrode to display interference image.

14. The displayer according to claim 7, wherein, the first pixel electrode and the second pixel electrode are disposed in parallel, or the first pixel electrode is fully surrounded by the second pixel electrode, or the first pixel electrode is partially surrounded by the second pixel electrode.

15. The displayer according to claim 7, wherein, the cell substrate is a color filter substrate comprising a color filter, a substrate provided on the color filter, and an upper polarizing filter provided on the substrate, and the FPR film array is attached on the upper polarizing filter.

16. The displayer according to claim 15, wherein, the color filter substrate comprises a transparent portion provided in the same layer as that of the color filter, the color filter being corresponding to the first pixel electrode, and the transparent portion being corresponding to the second pixel electrode.

* * * * *